US012771742B2

(12) United States Patent
Ram et al.

(10) Patent No.: US 12,771,742 B2
(45) Date of Patent: Oct. 20, 2026

(54) PEER NODES DISCOVERY USING SECRETS

(71) Applicant: MELLANOX TECHNOLOGIES, LTD., Yokneam (IL)

(72) Inventors: Refael Ram, Herzeliya (IL); Evgeny Tantsura, Palo Alto, CA (US); Alex Netes, Rehovot (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 67 days.

(21) Appl. No.: 18/675,668

(22) Filed: May 28, 2024

(65) Prior Publication Data

US 2025/0373688 A1 Dec. 4, 2025

(51) Int. Cl.
*H04L 67/1061* (2022.01)
*H04L 9/40* (2022.01)

(52) U.S. Cl.
CPC .......... *H04L 67/1063* (2013.01); *H04L 63/08* (2013.01); *H04L 63/166* (2013.01)

(58) Field of Classification Search
CPC .... H04L 67/1063; H04L 63/08; H04L 63/166
See application file for complete search history.

(56) References Cited

U.S. PATENT DOCUMENTS 7,796,593 B1 * 9/2010 Ghosh ...................... H04L 45/32 370/395.31
2014/0010108 A1 * 1/2014 Tavildar ................ H04W 8/005 370/254
2018/0183596 A1 * 6/2018 Deshpande ........... H04W 12/03
2023/0239235 A1 * 7/2023 He .......................... H04L 45/50 370/225

* cited by examiner

*Primary Examiner* — Minh Chau Nguyen
(74) *Attorney, Agent, or Firm* — Hogan Lovells Cadwalader US LLP

(57) ABSTRACT

Systems and methods herein are for a network having at least one host processor of a host node to discover peer nodes in the network. The at least one host processor can communicate a group identifier (ID) with further nodes in the network, where the group ID is based in part on a secret. A subset of the nodes can identify as part of a community within the network based in part on the group ID. The at least one host processor can use a key, which may be also based in part on the secret, with at least one node of the subset of the nodes to validate the host node and the at least one node as the peer nodes within the network based in part on being associated with the key.

20 Claims, 7 Drawing Sheets

PEER NODES DISCOVERY USING SECRETS

TECHNICAL FIELD

At least one embodiment pertains to preparing peer nodes within a network.

BACKGROUND

A cluster of dispersed processors in different nodes may be generated for purposes of enabling high availability for software applications that use such dispersed processors. The different nodes may form a cluster of peers by common information shared therebetween. For example, the different nodes in the network may use the same or similar identifiers. However, for a node to discover other nodes in a network that share the common information, a discovery process may perform certain requirements. For example, the discovery process may need deployment of new network entities or dedicated coordination with other network entities to support the discovery process.

DETAILED DESCRIPTION

Figure 1:
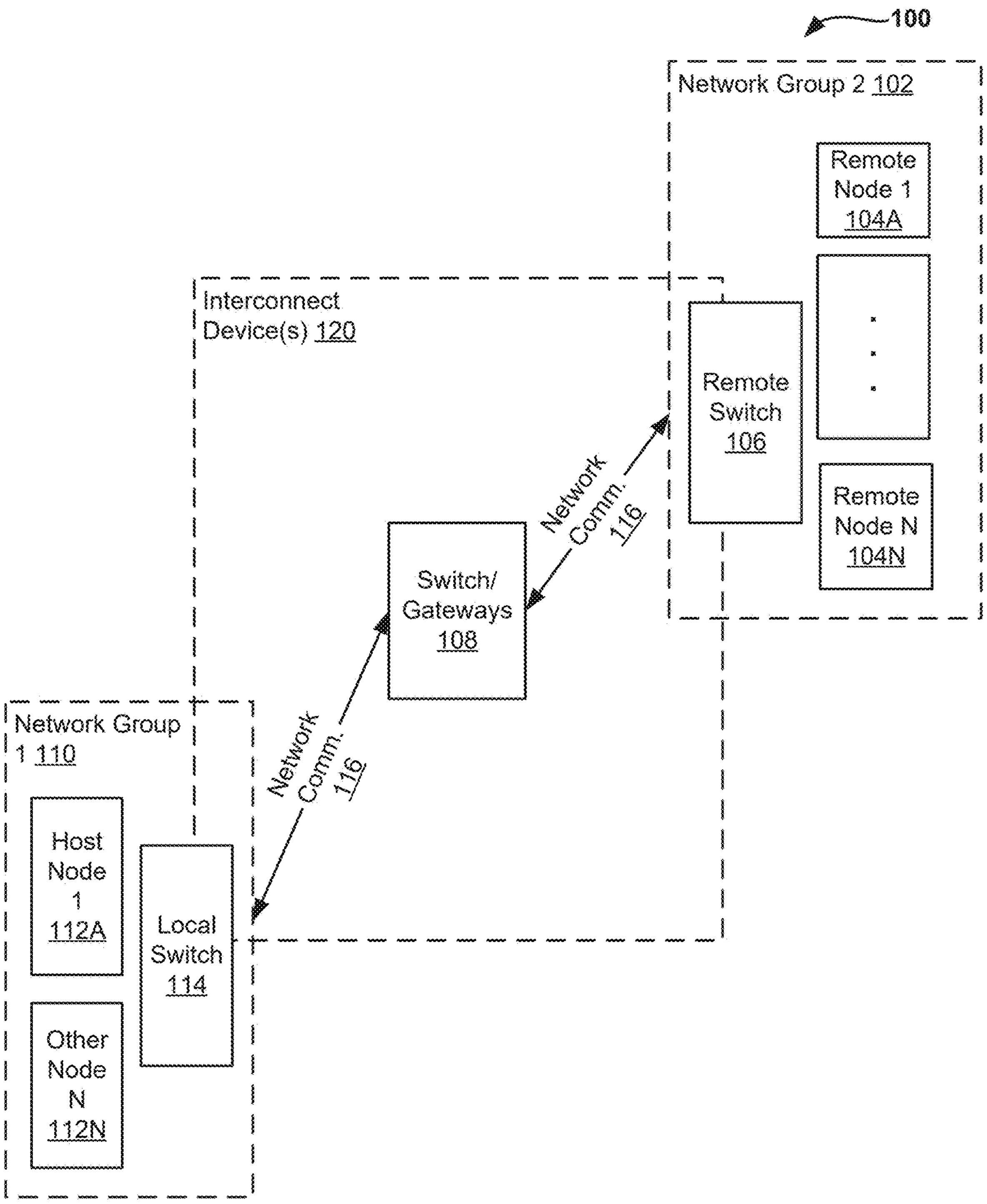
FIG. 1 illustrates a network that is subject to embodiments for autonomous discovery of peer nodes using secrets.

FIG. 1 illustrates a network 100 that is subject to embodiments for autonomous discovery of peer nodes using secrets, as detailed herein. In one example, the network 100 is subject to the Border Gateway Protocol (BGP). In addition, cryptographic techniques may be provided in the network 100 to enable efficient and secure auto-discovery of peer nodes that may share the same secret. The efficient and secure auto-discovery of peer nodes may be performed without requiring a configuration of unique identifiers or deployment of additional network entities. Further, the autonomous discovery herein does not require deployment of new network entities and does not require dedicated coordination with other network entities. Therefore, it is possible to minimize excessive network traffic to avoid overburdening network resources while allowing for validation of peer nodes that genuinely possess the same secret information without exposing any data that could give malicious nodes an advantage or compromise the system's security. For example, a group identifier (ID) may be used to form a community of nodes that may share the same secret.

However, this process may not exclude a malicious node that may coincidently generate a same group ID as in the community. The use of a further key from a further hash of the secret provides, in part, an efficient and secure auto-discovery of peer nodes as it confirms that at least one potential peer node actually possess the same secret to be validated as a peer node.

In at least one embodiment, the network 100 may include multiple nodes (or host machines) and network devices, altogether forming aspects of a system to apply a method for autonomous discovery of peer nodes. The system in network 100 can address issues where an individual processor unit (such as, a central processing unit (CPU)) of a switch tray, for instance and acting as a host node, needs to identify other processor units of other switch trays to form a high-availability cluster. Such a high-availability cluster may be for Software-Defined Networking (SDN) services. An example SDN may be a Subnet Manager (SM) or Global Fabric Manager (GFM). A system backplane serial number or chassis identifier (ID) may be used as the secret. The chassis ID may be known to all processing units of switch trays that are within a rack, but may not be known outside the rack. The processing units of the switch trays may be able to autonomously generate or obtain the secret from the chassis ID. Then, a group ID or community ID may be derived from the secret using a cryptographic hash function, for example. The cryptographic hash function is also referred to as a hash function or a hash herein.

In an example approach, the network 100 and a method for an underlying system to the network 100 performs a connection establishment step in which all nodes in a network are configured to open a connection with a route server. A step for generating a group ID may be performed. In this step, each of the nodes may compute a respective group ID using a cryptographic hash function of the shared secret. When the network is a BGP network, the group ID may be a community ID of the BGP network. A route advertisement step, which follows, may need each of the nodes that have an egress policy to attach the computed group ID to a message that may be sent along with the route information. Route filtering may be performed for each node that has an ingress policy to permit routes only from nodes belonging to the same group ID.

A subset of the nodes may be associated with the same group ID. This, in part, represents a potential peer identification step that may be performed for all the received routes with the same group ID as the host node, which are considered potential peer nodes. The potential peer identification may proceed further with generation of an encryption key using a different hash function than used for generating the group ID. This may be performed by cooperation between at least two nodes that are potential peer nodes of the community. As this is a different step from the hash function used for generating the group ID, the encryption key is different from the group ID. Further, the encryption key (also generally referred to as a key herein) may be used with a peer validation step. Peer validation may be formed separately from or together with the identification of the potential peer nodes. Peer validation may involve the host node validating that a potential peer node actually possesses the same secret. This may be performed by establishing direct encrypted communication with the other potential peer node, using the generated encryption key. For example, such an approach may include performing a client-server exchange using mutual Transport Layer Security (mTLS) and using the encryption key, where a successful exchange validates the host node and the other potential peer node as actually being the peer nodes.

As a result, the network 100 herein enables autonomous or auto-discovery of peer nodes with a similar secret and does so without requiring configuration of unique identifiers of the other nodes. The autonomous discovery of peer nodes herein may be performed in an efficient manner by leveraging existing exchanged messages of a community, for instance, and may be performed using BGP that may already be used for routing purposes in at least some networks. Additionally, the autonomous discovery of peer nodes herein ensures security by validating that peer nodes genuinely possess the same secret, without exposing the secret itself. For example, the establishment of the peer nodes by the client-server exchange uses encrypted communication from a derived encryption key.

In one example, the network 100 may include at least one circuit that may be an execution unit of a processor that may be within a switch 106; 114, any one of different interconnect devices 120, or first or second group nodes 1-N 104A-N; 1-N 112A-N. An interconnect device may allow communication across a wider network group and may include different switches and/or gateways 108, whereas communications in a narrower network group or within a network group may be enabled by at least one switch 106, 114. Further, the switches may communicate with each other independent of the nodes to share configuration information for various routes in the network 100.

The switch 106; 114 may be associated with a respective one rack, chassis, or other form of a physical collection illustrated as network group 2 102; 1 110 of nodes or other endpoints 1-N 104A-N; 1-N 112A-N, as illustrated. However, the autonomous or auto-discovery of peer nodes herein allows for one or more of the nodes in a same or in different network groups to be form peer nodes. Further, the network 100 may include at least a switch or gateway 108, as part of one or more interconnect devices 120, to provide communications 116 between multiple switches 106, 114 and, therefore, between the first or second group nodes 1-N 104A-N, 1-N 112A-N across a wider network group. However, the approaches for autonomous discovery of peer nodes using secrets may be performed within a network group or between network groups. Therefore, descriptions herein to an interconnect device 120 may be understood as applicable using any of the switches 106, 114 or gateways 108 illustrated.

In one example, the communications 116 may be Ethernet, InfiniBand® (IB), NVLink®, Bluetooth®, or any suitable communications that can benefit from the autonomous discovery of peer nodes described herein. Further, any communications network supporting BGP, including Transmission Control Protocol (TCP) or Internet Protocol (IP) on top of TCP, may be used with the autonomous discovery of peer nodes described herein. When the communications 116 is IB or NVLink, at least one of the multiple switches 106, 114 or at least one of the first or the second group nodes 1-N 104A-N; 1-N 112A-N may be able to host a Subnet Manager (SM) or any required feature for the relevant IB or NVLink protocols. Similarly, when the communications 116 are Ethernet communications, then least one of the multiple switches 106, 114 may be able to host or function as a Switch Manager (SM).

In at least one embodiment, when the network 100 is adapted for BGP, the switches 106, 114 may be spine or leaf switches. As such, each network group 2 102; 1 110 of nodes or other endpoints 1-N 104A-N; 1-N 112A-N may communicate within the group using the leaf switches 106, 114 and may communicate across groupings using spine switches or gateways 108. The autonomous discovery of peer nodes using the network 100 can overcome technical constraints and limitations associated with auto-discovery approaches. For example, the autonomous discovery of peer nodes herein may address issues with a layer 2 broadcast domain or multicast requirement, where there may be mandates that all nodes be deployed within a layer 2 broadcast domain or have a multicast path between them for auto-discovery. This requirement may be impractical in datacenter environments due to security concerns and IP network topology constraints.

In another example, the autonomous discovery of peer nodes herein may address issues from reliance on external services, such as Dynamic Host Configuration Protocol (DHCP) or Domain Name System (DNS). While DHCP and DNS may be used to identify cluster members, this may be subject to security concerns, such as, from different ownership authorities governing the external services and the nodes. In yet another example, the autonomous discovery of peer nodes herein may address issues from unique identifier configuration that may be otherwise required.

In yet another example, the autonomous discovery of peer nodes herein can address issues of requiring dedicated network infrastructure other, which increases complexity and overhead in an auto-discovery process. In contrast, the autonomous discovery of peer nodes herein leverages existing infrastructure, such as, BGP infrastructure, and leverages cryptographic techniques to enable secure and efficient auto-discovery without the aforementioned issues. In one example, the autonomous discovery of peer nodes herein can operate within an IP network topology, without relying on external services or dedicated network entities. Further, the autonomous discovery of peer nodes herein does not require the configuration of unique identifiers for each node.

Figure 2:
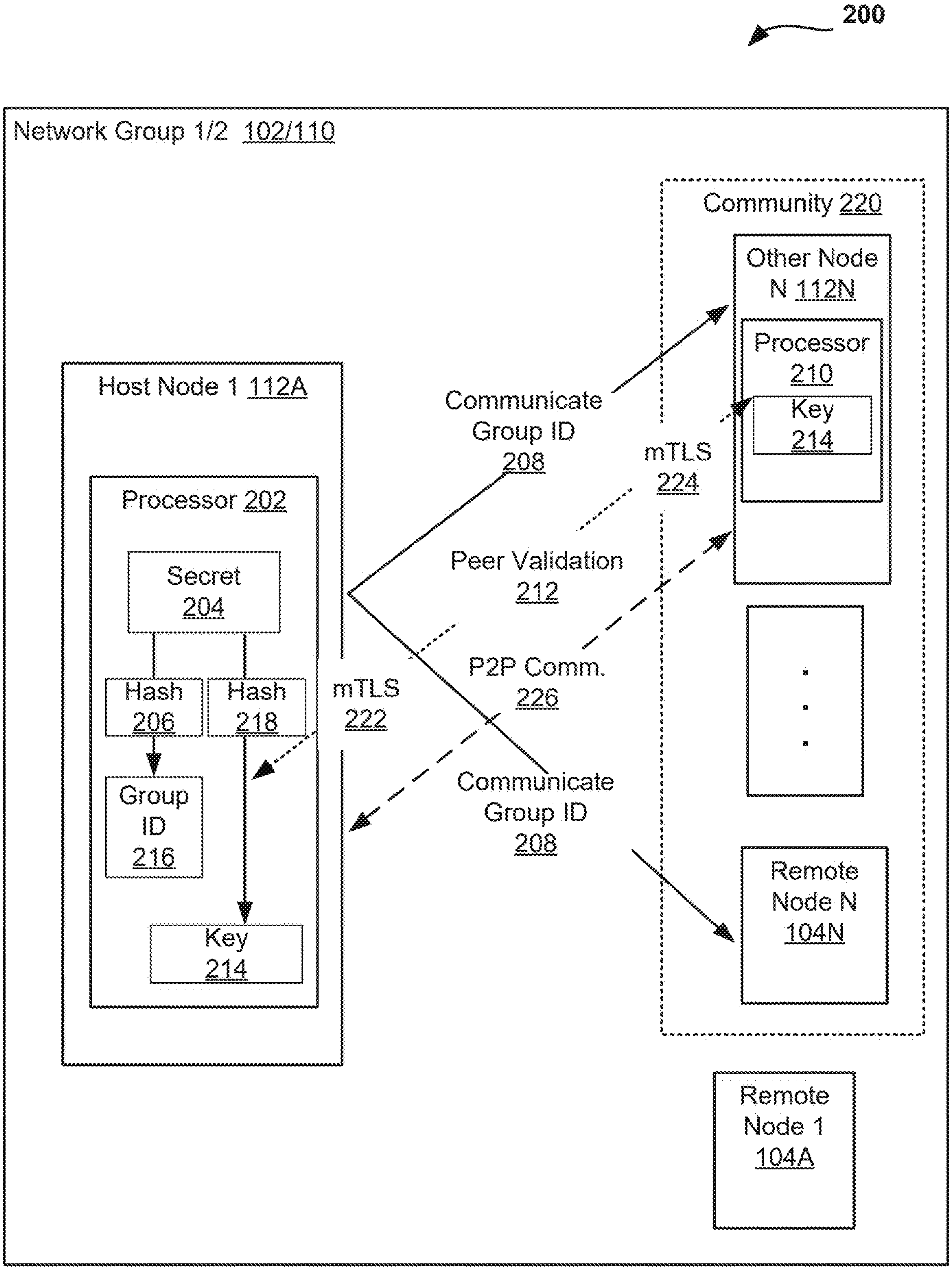
FIG. 2 illustrates communications in a system for autonomous discovery of peer nodes using secrets, according to at least one embodiment.

FIG. 2 illustrates communications in a system 200 for autonomous discovery of peer nodes using secrets, according to at least one embodiment. The system 200 may include a network 100 of different group nodes 1-N 104A-N; 1-N 112A-N, having individual processors and able to perform or participate in the autonomous discovery of peer nodes. The system 200 includes at least one host processor 202 of a host node 1 112A to discover peer nodes in a network 100. A host node may be an initiator of the autonomous discovery of peer nodes to become peers with another node. In one example, the nodes 1 112A, N 112N illustrated may be discovered as peer nodes to enable peer to peer (P2P) communications 226. In one example, the nodes 1 112A, N 112N herein may each be a switch tray of a chassis, but could also be remote nodes (such as, node N 104N). The at least one host processor 202 of a host node 1 112A may be able to communicate 208 a group ID 216 through the network 100 to the other nodes 1-N 104A-N; 1-N 112N. For example, at least the host node 1 112A is capable of advertising its communication and at least one of the other first or second group nodes 1-N 104A-N; N 112N is capable of receiving such a communication. For example, the host node 1 112A may have an egress policy in the network 100 to enable such a communication using route information associated therewith. Similarly, at least one of the other first or second group nodes 1-N 104A-N; N 112N may be associated with an ingress policy in the network 100 to permit receipt of such communication.

Further, the group ID 216 may be based in part on a secret 204. For example, the group ID 216 may be based in part on hash 206 of a secret 204. A group ID 216 for the community 220 may be derived from or based on the user provided secret 204. Further, the secret 204 being a user provided secret may be in both the host node 1 112A and at least one other node 1-N 104A-N; N 112N in the network 100 that is intended to be peer nodes with the host node 1 112A. Further, the secret 204 may be obtained or generated autonomously by different processors. In one example, an autonomously generated secret may be a chassis ID of a chassis having different processors (in their respective switch trays or other cards or components) installed therein, where each of the different processors autonomously generate the same secret because of being part of the same chassis and having the same chassis ID. Therefore, the chassis ID may be used to generate a group ID by a hash function. For example, at least one of the network group 1 or 2 102; 110 may be a physical chassis with different switch trays, cards, or other components therein. Each switch tray may have a processor subject to forming autonomously forming a peer node among the processors of the different switch trays that are in the same chassis. The different processors may, therefore, include the at least one host processor 202 and a further processor 210 of at least one other node N 112N that may be intended to be part of the peer nodes with the at least one host processor 202. Therefore, it is possible to share a secret to different nodes to allow the nodes to, at a different time, form peer nodes autonomously.

As illustrated in FIG. 2, at least one of the other nodes N 112N, 1 104A, N 104N in the network 100 may receive the communicated group ID 208 and may determine that they are part of a community 220 by being able to generate a same hash from their own secret, which would indicate that the two nodes N 112N, N 104N have the same secret. The formation of the community 220 supports identification of potential peer nodes. The hash 206 may be a reference to a hash algorithm that is used to generate the group ID 216 from the secret 204. The hash algorithm may be common to the community or indicated between the nodes during an initial communication. Therefore, the two nodes 1 112N, N 104N having the same secret and generating the same group ID may be part of a subset of the nodes 1-N 104A-N, 1-N 112A-N and may identify as part of a community 220 within the network 100, based in part on the group ID. As illustrated, there may be other nodes 1 104A that do not have the same secret and that cannot generate the same group ID 216 and, therefore, are not part of the community 220.

Further, once the subset has been identified as a community 220, the at least one host processor 202 can prepare a key 214 which may be also based in part on the secret 204. The key 214 may be generated using a different hash algorithm 218 and may be used in a peer validation 212 process. The peer validation 212 process allows determination of at least one node, such as the local host N 112N, of the subset of the nodes forming a community 220, is to be validated as a peer node with the host node 1 112A. Pertinently, the host node 1 112A and the at least one node N 112N are to be validated as the peer nodes within the network 100 based in part on being associated with the key 214. Further, the validation of peer nodes may be performed by initially generating the same key 214 that is based in part on the secret and by exchange of public keys under the mTLS 222, 224 process. Thereafter, P2P communications 226 may be performed between the peer nodes, where the P2P process is more secure than broader communications in the community 220.

In one example, as part of the peer validation 212 process, the nodes 1 112A, N 112N can identify as peer nodes by performing a client-server exchange using mutual Transport Layer Security (mTLS) and using the key to identify as the peer nodes. The mTLS approach is a version of a TLS protocol but allows the use of mutual authentication between one node acting as a client and another node acting as a server. Once a subset of nodes has been identified as a community 220, the host node 1 112A may initiate the peer validation 212 process, as a client, or the at least one node N 112N may initiate the peer validation 212 process, as the client.

For example, the host node 1 112A may receive a request from the at least one node N 112N, acting as a client, that is within the community 220. The request may use mTLS 222, 224 to validate that at least one node 1 112N is a peer node with the host node 1 112A. The host node 1 112A, acting as a server, may indicate to use one of the types of encryption and may provide a public key as part of the mTLS 222, 224 process for validating the at least one node N 112N as a peer node. The public keys may be distinct from the key 214 used finally for secure communication between the nodes. Both nodes 1 112A, N 112N may perform other verifications of any exchanged certificates using, for example, a trusted authority.

Once the certificates are verified, if needed, for each of the nodes 1 112A, N 112N, the public keys may be also verified. As the public keys are verified, both nodes have the same secret that allows validation of peer nodes between the two nodes that is exclusive within the community 220. Once validated, further communications between the peer nodes are provided under the P2P communications 226 that may use the key 214 all throughout. In at least one embodiment, all such steps between the two nodes may include more than two nodes of the community 220. All such steps represent the peer validation 212 process and may be used at different times within the community to add peer nodes, to drop peer nodes, and to discover new peer nodes, at any time and in an autonomous manner.

In at least one embodiment, the peer validation 212 process may be performed for all the received routes within the community 220 because all nodes of the community 220 may be potential peer nodes. This approach, however, is more efficient by reducing the number of nodes that are potential peer nodes and providing further exclusivity within the community 220. The peer validation 212 process may also progress by generating a key 214 that may be also referred to herein as an encryption key and which may be generated by cooperation by at least two nodes of the community. The encryption key 214 may be generated by a further hash function 218 that may be agreed upon by the two nodes involved and may be generated by using the shared secret as at least one input to the hash function 218.

Further, the peer validation 212 process may be understood as a validation that the host node and a potential peer node actually possesses the same secret. For example, establishing of the direct encrypted communication between the host node 1 112A and the at least one node N 112N, using the generated encryption key 214 that is based on the same secret, can be indicative that the two nodes possess the same secret as a second security layer over the two nodes being part of the same community 220. As it is possible for a malicious node to coincidently use a group or community identifier (ID), in one example, the peer validation 212 process may be understood as a validation that the host node and a potential peer node actually possesses the same secret by the further encryption key 214.

Figure 3:
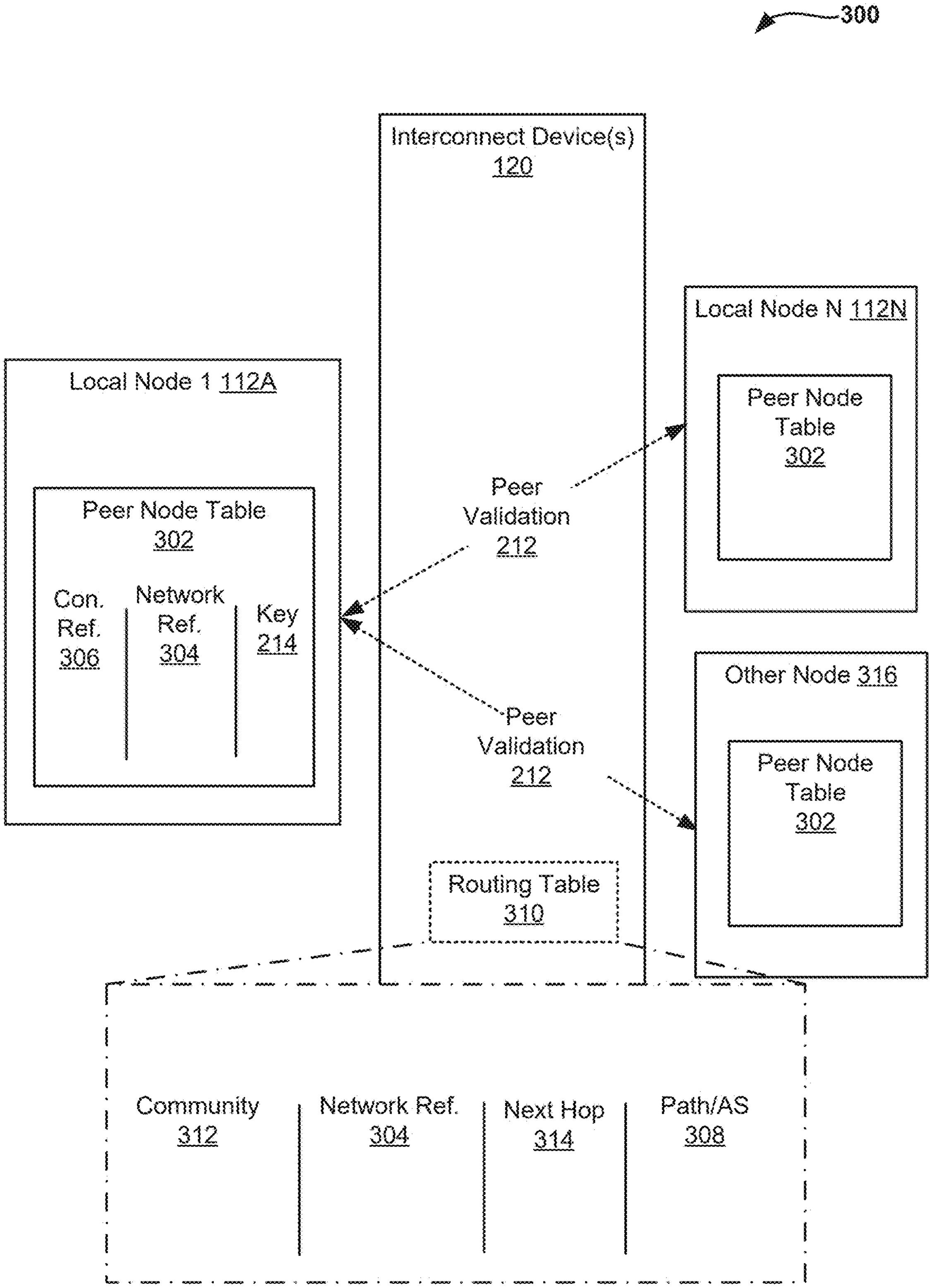
FIG. 3 illustrates routing aspects in a system for autonomous discovery of peer nodes using secrets, according to at least one embodiment.

FIG. 3 illustrates routing aspects 300 in a system for autonomous discovery of peer nodes using secrets, according to at least one embodiment. The aspects 300 illustrates features that may be used for purposes of routing or retaining the peer nodes in a network 100. In one example, a host node 1 112A and the at least one node 1 112N that identifies as peer nodes may be able to generate and retain an address table (also referred to herein as a peer node table 302) of network addresses or references 304, the key 214, and a reference number 306 for the connection. Further, the address table may be associated with the peer nodes based in part on a secure connection being established by the peer validation 212 process between the host node and the at least one node. The peer node table 302 may, therefore, retain separate entries for separate peer node relationships, such as, between the host node 1 112A with at least one other node N 112N and between the host node 1 112A and yet another node 316.

The aspects 300 also illustrates that, for purposes of routing or retaining the peer nodes in a network 100, at least one network device of the interconnect devices 120 may include a routing table 310. The routing table 310 may be in an SM, in one example. The routing table 310 may be continuously updated based in part on new peer nodes being discovered or changed, such as, being removed from being peer nodes. For example, the routing table 310 may have a path or autonomous system (path/AS) 308 field that may include exchange routing and reachability information that is indicative of two nodes being peer nodes or potential ones of the peer nodes. Further, the routing table 310 can also include a representation for the subset of the nodes being part of a community by a community 312 field. The next hop 314 field may be provided, in part, by the route to be taken according to the path/AS 308 field in the routing table 310.

Figure 4:
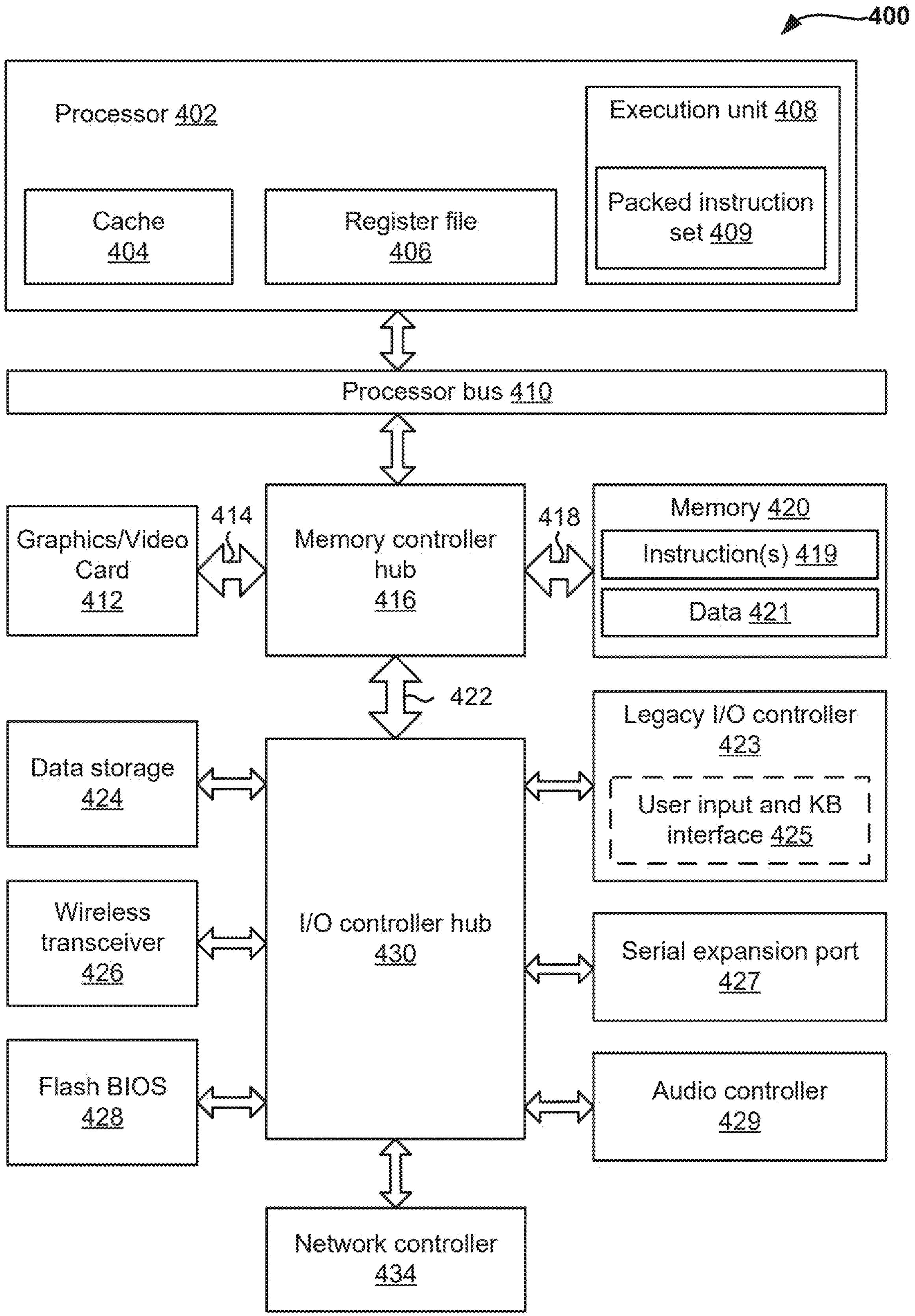
FIG. 4 illustrates computer and processor aspects of a system for autonomous discovery of peer nodes using secrets, according to at least one embodiment.

FIG. 4 illustrates computer and processor aspects 400 of a system for autonomous discovery of peer nodes using secrets, according to at least one embodiment. The computer and processor aspects 400 may be performed by one or more processors that include a system-on-a-chip (SOC) or some combination thereof formed with a processor that may include execution units to execute an instruction, according to at least one embodiment. Such one or more processors may include CPUs, data processing units (DPUs), and graphics processing units (GPUs) and may be within a switch 106; 114, any one of different interconnect devices 120, or first or second group nodes 1-N 104A-N; 1-N 112A-N, as described all throughout herein.

In at least one embodiment, the computer and processor aspects 400 may include, without limitation, a component, such as a processor 402 to employ execution units including logic to perform algorithms for process data, in accordance with present disclosure, such as in embodiment described herein. In at least one embodiment, the computer and processor aspects 400 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, the computer and processor aspects 400 may execute a version of WINDOWS® operating system available from Microsoft® Corporation of Redmond, Wash., although other operating systems (UNIX® and Linux®, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, the computer and processor aspects 400 may include, without limitation, a processor 402 that may include, without limitation, one or more execution units 408 to perform aspects according to techniques described with respect to at least one or more of FIGS. 1-3 and 5-7 herein. In at least one embodiment, the computer and processor aspects 400 is a single processor desktop or server system, but in another embodiment, the computer and processor aspects 400 may be a multiprocessor system.

In at least one embodiment, the processor 402 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, a processor 402 may be coupled to a processor bus 410 that may transmit data signals between processor 402 and other components in computer and processor aspects 400.

In at least one embodiment, a processor 402 may include, without limitation, a Level 1 ("L1") internal cache memory ("cache") 404. In at least one embodiment, a processor 402 may have a single internal cache or multiple levels of internal cache. In at least one embodiment, cache 404 may reside external to a processor 402. Other embodiments may also include a combination of both internal and external caches depending on particular implementation and needs. In at least one embodiment, a register file 406 may store different types of data in various registers including, without limitation, integer registers, floating point registers, status registers, and an instruction pointer register.

In at least one embodiment, an execution unit 408, including, without limitation, logic to perform integer and floating point operations, also resides in a processor 402. In at least one embodiment, a processor 402 may also include a microcode ("ucode") read only memory ("ROM") that stores microcode for certain macro instructions. In at least one embodiment, an execution unit 408 may include logic to handle a packed instruction set 409.

In at least one embodiment, by including a packed instruction set 409 in an instruction set of a general-purpose processor, along with associated circuitry to execute instructions, operations used by many multimedia applications may be performed using packed data in a processor 402. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, an execution unit 408 may also be used in microcontrollers, embedded processors, graphics devices, DSPs, and other types of logic circuits. In at least one embodiment, the computer and processor aspects 400 may include, without limitation, a memory 420. In at least one embodiment, a memory 420 may be a Dynamic Random Access Memory ("DRAM") device, a Static Random Access Memory ("SRAM") device, a flash memory device, or another memory device. In at least one embodiment, a memory 420 may store instruction(s) 419 and/or data 421 represented by data signals that may be executed by a processor 402.

In at least one embodiment, a system logic chip may be coupled to a processor bus 410 and a memory 420. In at least one embodiment, a system logic chip may include, without limitation, a memory controller hub ("MCH") 416, and processor 402 may communicate with MCH 416 via processor bus 410. In at least one embodiment, an MCH 416 may provide a high bandwidth memory path 418 to a memory 420 for instruction and data storage and for storage of graphics commands, data and textures. In at least one embodiment, an MCH 416 may direct data signals between a processor 402, a memory 420, and other components in the computer and processor aspects 400 and to bridge data signals between a processor bus 410, a memory 420, and a system I/O interface 422. In at least one embodiment, a system logic chip may provide a graphics port for coupling to a graphics controller. In at least one embodiment, an MCH 416 may be coupled to a memory 420 through a high bandwidth memory path 418 and a graphics/video card 412 may be coupled to an MCH 416 through an Accelerated Graphics Port ("AGP") interconnect 414.

In at least one embodiment, the computer and processor aspects 400 may use a system I/O interface 422 as a proprietary hub interface bus to couple an MCH 416 to an I/O controller hub ("ICH") 430. In at least one embodiment, an ICH 430 may provide direct connections to some I/O devices via a local I/O bus. In at least one embodiment, a local I/O bus may include, without limitation, a high-speed I/O bus for connecting peripherals to a memory 420, a chipset, and processor 402. Examples may include, without limitation, an audio controller 429, a firmware hub ("flash BIOS") 428, a wireless transceiver 426, a data storage 424, a legacy I/O controller 423 containing user input and keyboard interfaces 425, a serial expansion port 427, such as a Universal Serial Bus ("USB") port, and a network controller 434. In at least one embodiment, data storage 424 may comprise a hard disk drive, a floppy disk drive, a CD-ROM device, a flash memory device, or other mass storage device.

In at least one embodiment, FIG. 4 illustrates computer and processor aspects 400, which includes interconnected hardware devices or "chips", whereas in other embodiments, FIG. 4 may illustrate an exemplary SoC. In at least one embodiment, devices illustrated in FIG. 4 may be interconnected with proprietary interconnects, standardized interconnects (e.g., PCIe®) or some combination thereof. In at least one embodiment, one or more components of the computer and processor aspects 400 that are interconnected using compute express link (CXL) interconnects.

In at least one embodiment, the system in FIGS. 1-4 therefore include one or more execution units 408 in the within a switch 106; 114, any one of different interconnect devices 120, or first or second group nodes 1-N 104A-N; 1-N 112A-N to support autonomous or auto-discovery of peer nodes. For example, at least one execution unit 408 supports autonomous or auto-discovery of other processing units of the other host machines (or nodes). The at least one execution unit 408 is part of one or more circuits which are to be associated as peer nodes in a network. For example, the at least one execution unit 408 of a processor may be a circuit that is to be part of a peer node with another circuit of another processor in a different node.

In one example, therefore, two or more circuits of different execution units 408 that to be associated as peer nodes in a network 100 can use a group ID and a key which are based in part on a secret. First, a subset of nodes that include the two or more circuits may be identified as part of a community 220 within the network based in part on the group ID, which may be derived from or generated from a secret using a first hash function. Then, the two or more circuits are further to use the key within the subset of the nodes to identify as the peer nodes within the network. The key may be also derived from or generated form the secret using a second hash function. Further, the two or more circuits of the subset of the nodes can perform a client-server exchange using mutual Transport Layer Security (mTLS) and may use the key to identify as the peer nodes. Still further, the two or more circuits can be in a network that is associated with Border Gateway Protocol (BGP). The group ID may then be a community ID of the BGP.

In a further example, the two or more circuits may use a shared secret to generate a respective group ID in the network. The secret may be a user provided secret for two or more circuits of the subset of the nodes in the network. In another example, the two or more circuits may be provided in different processors and the secret may be a chassis ID of a chassis having the different processors installed therein. The two or more circuits can generate and retain an address table of network addresses associated with the peer nodes, as illustrated and detailed in FIG. 3. This address table may be based in part on a secure connection established, using the key, between the two or more circuits. Further, the two or more circuits are to communicate using at least one network device, as also illustrated and detailed in FIG. 3. In one example, the at least one network device may include a routing table which may be updated to represent that the subset of the nodes is part of the community and that the two or more circuits are part of the peer nodes.

Figure 5:
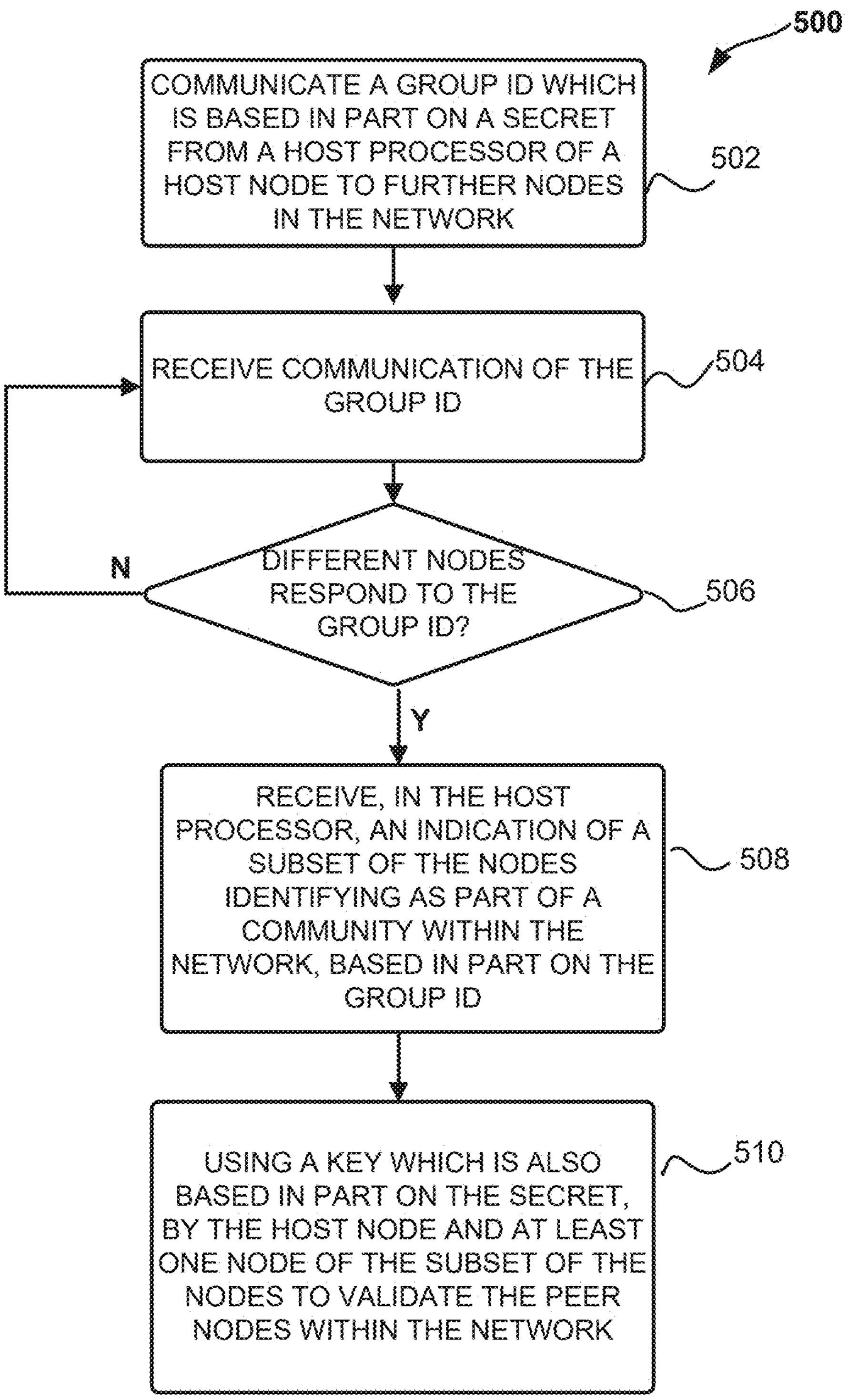
FIG. 5 illustrates a process flow in a system for autonomous discovery of peer nodes using secrets, according to at least one embodiment.

FIG. 5 illustrates a process flow or method 500 in a system for autonomous discovery of peer nodes using secrets, according to at least one embodiment. The method 500 may include communicating 502 a group ID which is based in part on a secret from a host processor of a host node to further nodes in the network. The further nodes can receive 504 communication of the group ID and can determine if they have or can generate a same or related group ID. Then different nodes of the further nodes can respond and the host node can determine or verify 506 that responses are being received.

The method 500 may include receiving 508, in the host processor, an indication of a subset of the nodes, of the further nodes that identify as part of a community within the network, based in part on the group ID. For example, the responses may be from those nodes having the same or related group ID. The method 500 may further includes using 510 a key which is also based in part on the secret, by the host node and at least one node of the subset of the nodes to form the peer nodes within the network. For example, the at least one node and the host node may generate a respective key using a hash function and the secret. The hash function is different than used for the group ID. The at least one node and the host node may then use an mTLS process and the key to validate as peer nodes.

Figure 6:
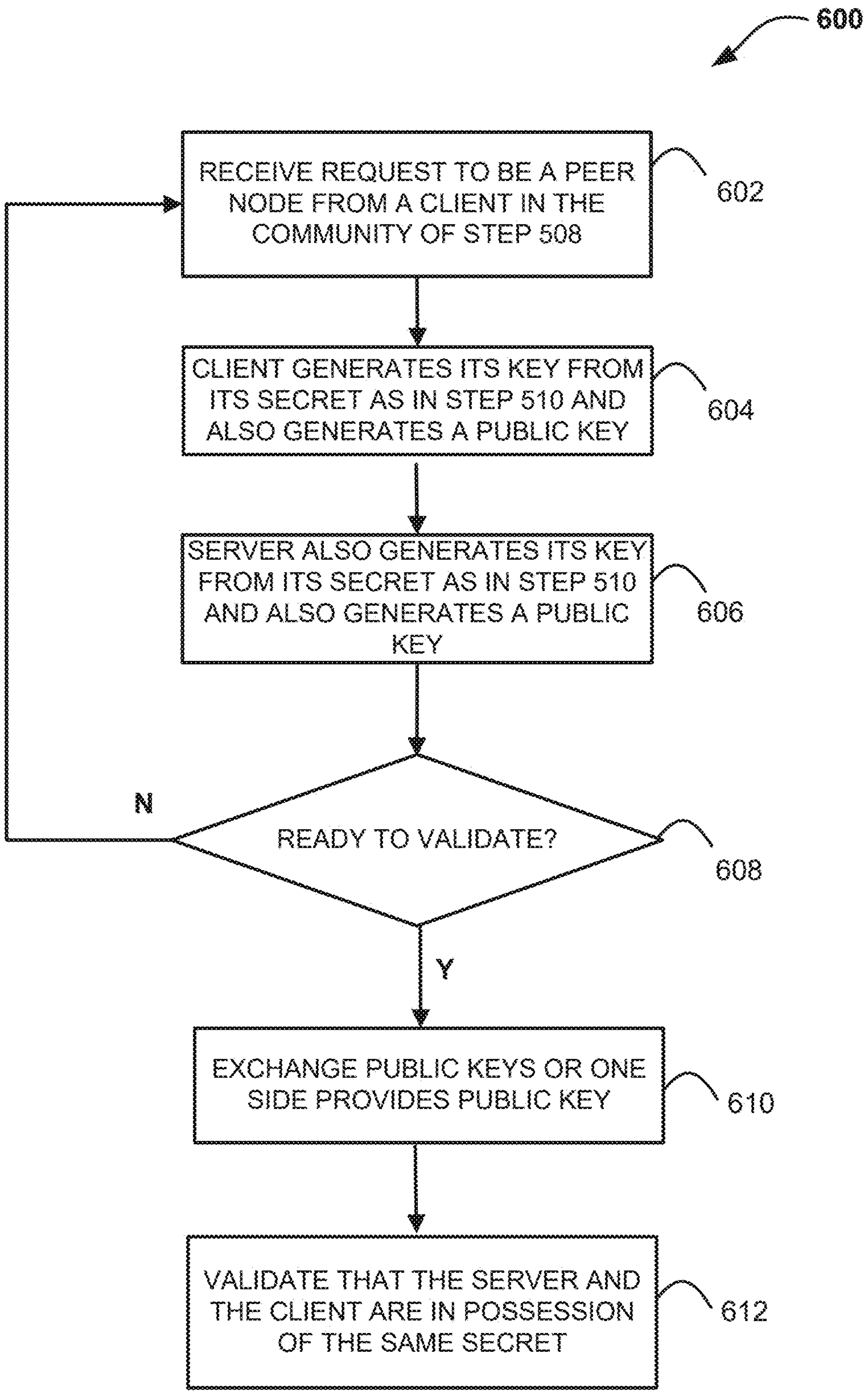
FIG. 6 illustrates yet another process flow in a system for autonomous discovery of peer nodes using secrets, according to at least one embodiment.

FIG. 6 illustrates yet another process flow or method 600 in a system for autonomous discovery of peer nodes using secrets, according to at least one embodiment. The method 600 may be in support of the method 500 in FIG. 5. For example, the method 600 may include receiving 602 a request to be a peer node from a client in the community, as part of step 508. The method 600 may include the client generating 604 its key from its secret as in step 510 using a hash function. The client may also generate a public key from its key such as described with respect to at least FIG.

2. The method 600 may include the server also generating 606 its key from its secret as in step 510 and using a hash function that is the same as the client. In one example, the client may include the hash function it intends to use in its request. In another example, the client may indicate its available hash functions, in its request, for the server to choose and to use. The server may also generate a public key from its key such as described with respect to at least FIG. 2. However, a single sided validation by the server alone is possible. When it is verified or determined 608 that at least the server is ready to validate, there may be an exchange 610 of public keys or at least the client side may provide its public key. Then, assuming that the client and the server have the same private keys generated from the same secret, both the server and the client or at least the server can validate 612 that the server and the client are in possession of the same secret by decrypting the public key with the generated key.

Figure 7:
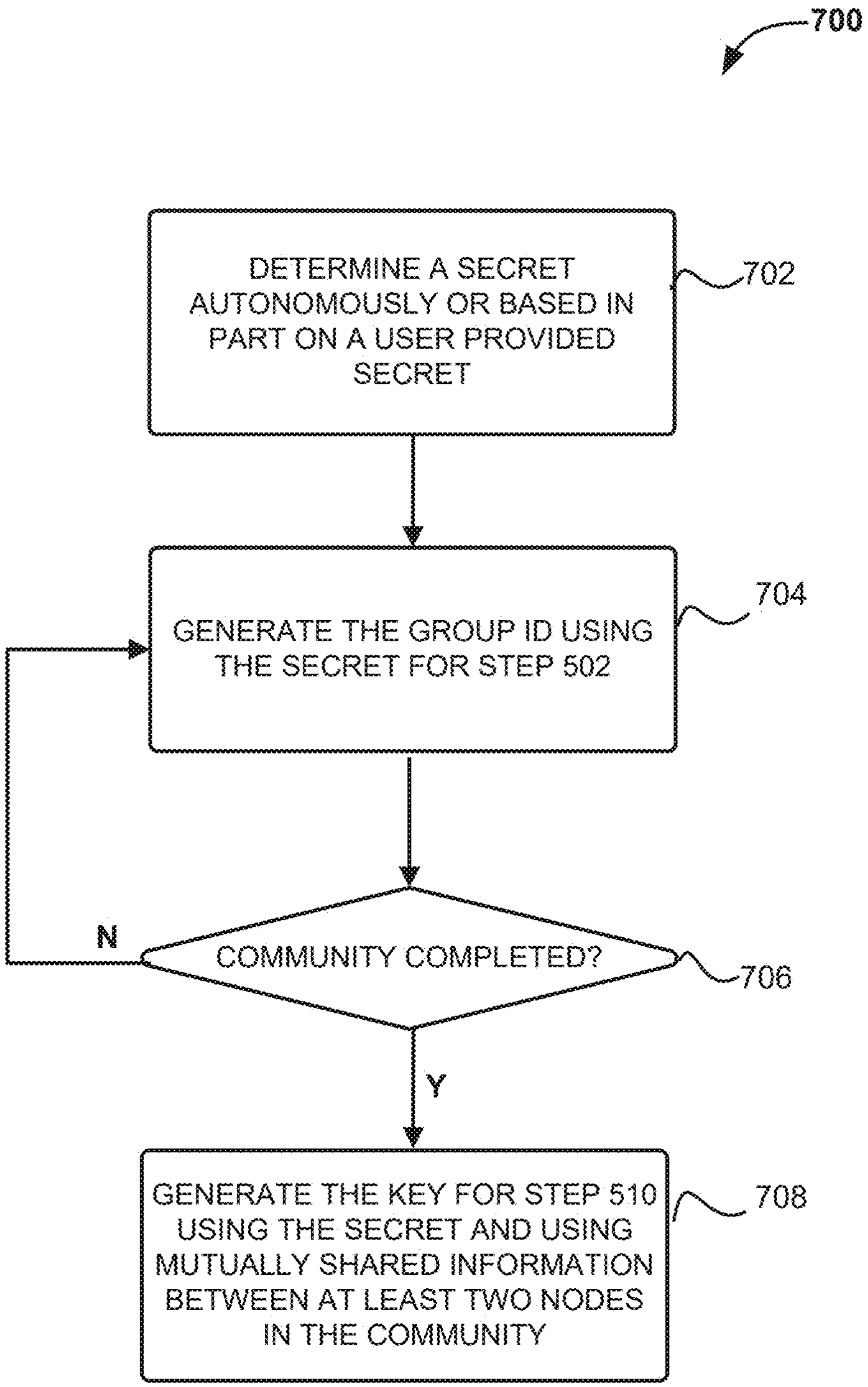
FIG. 7 illustrates a further process flow in a system for autonomous discovery of peer nodes using secrets, according to at least one embodiment.

FIG. 7 illustrates a further process flow or method 700 in a system for autonomous discovery of peer nodes using secrets, according to at least one embodiment. The method 700 may be in support of one or more of the method 500 in FIG. 5 or the method 600 in FIG. 6. For example, the method 700 may include determining 702 a secret, either autonomously or based in part on a user provided secret. At least the autonomously generated secret may be based in part on an identifier that is recognized within the respective host node, such as, a chassis ID, a medium access control (MAC) ID, or other unique ID. The method 700 may include generating 704 the group ID, for step 502, using the secret. The group ID may be generated from a hash algorithm applied to the secret and which may be known to the host node and to one or more other nodes in the network.

The method 700 may include determining or verifying 706 that the community is completely formed by at least one other node that has the same or a related group ID and that has responded to a request to form a community, as detailed with respect to FIGS. 1-6 herein. The method 700 may include generating 708 the key, for step 510, using the secret and using a different hash function than used for the group ID. For example, the key may be generated in each of the nodes intended to be a peer node using a cryptography hash algorithm that is different than the hash algorithm for the group ID, and that takes as input the secret that is known or shared between the nodes that are potential peer nodes. In at least one embodiment, step 510 may be based in part on a client-server exchange using mutual Transport Layer Security (mTLS) and using the key of step 708 to validate as the peer nodes, which is detailed in FIG. 6, for instance.

In at least one embodiment, one or more of the methods 500-700 may be performed within a network that is associated with BGP. Then, a community ID of the BGP may be based in part on the secret and may be used to form the community. Alternatively, the secret may be used to generate a group ID in a network not subject to BGP. Still further, the secret may be a user provided secret or a chassis ID and may be available to the host node and the at least one node intended to be peer nodes within the subset of the nodes that form a community within the network. When the secret is a chassis ID, the chassis ID may be for a chassis having different processors installed therein and that may need to be autonomously discovered as peer nodes within the chassis. This may be useful when the different processors include the at least one host processor and a further processor of the at least one node which together intend to form part of the peer nodes.

Further, in one or more of the methods 500-700, the host node and the at least one node in the peer nodes can generate and retain an address table of network addresses associated with the peer nodes. The address table may be based in part on a secure connection established, using the key, between the host node and the at least one node. Still further, one or more of the methods 500-700 may include a step or sub-step for communication between the host node and the further nodes using at least one network device. The one or more of the methods 500-700 may include a step or sub-step for updating a routing table in the at least one network device to represent that the subset of the nodes is part of the community and that the host note and the at least one node are part of the peer nodes. These steps or sub-steps are detailed with respect to at least FIG. 3 herein.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors.

In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

Accordingly, in at least one embodiment, computer systems are configured to implement one or more services that singly or collectively perform operations of processes described herein and such computer systems are configured with applicable hardware and/or software that allow performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. References may also be made to providing, outputting, transmitting, sending, or presenting analog or digital data. In at least one embodiment, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A network comprising at least one host processor of a host node to discover peer nodes in the network, the at least one host processor to communicate a group identifier (ID), generated by applying a first hash function to a secret, to further nodes in the network, wherein a subset of the nodes identify as part of a community within the network based in part on the group ID, wherein the at least one host processor is further to use a key, generated by applying a second hash function to the secret, the second hash function being different from the first hash function, with at least one node of the subset of the nodes, and wherein the host node and the at least one node are to validate as the peer nodes within the network based in part on being associated with the key.

2. The network of claim 1, wherein the host node and the at least one node of the subset of the nodes perform a client-server exchange using mutual Transport Layer Security (mTLS) and using the key to validate as the peer nodes.

3. The network of claim 1, wherein the network is associated with Border Gateway Protocol (BGP) and a community ID of the BGP is derived from the secret for the subset of the nodes.

4. The network of claim 1, wherein the group ID for the community is derived from the secret using a hash algorithm and wherein the secret is a user provided secret for the host node and the at least one node of the subset of the nodes in the network.

5. The network of claim 1, wherein the secret is generated autonomously by different processors installed therein and wherein the different processors comprise the at least one host processor and a further processor of the at least one node which together form all or part of the peer nodes.

6. The network of claim 1, wherein the host node and the at least one node in the peer nodes generate and retain an address table of network addresses associated with the peer nodes based in part on a secure connection established, using the key, between the host node and the at least one node.

7. The network of claim 1, further comprising at least one network device, the at least one network device comprising a routing table which is updated to represent that the subset of the nodes is part of the community and that the host node and the at least one node are potential ones of the peer nodes.

8. Two or more circuits to be associated as peer nodes in a network using a group identifier (ID), generated by applying a first hash function to a secret, and a key, generated by applying a second hash function to the secret, the second hash function being different from the first hash function, wherein a subset of nodes that include the two or more circuits first identify as part of a community within the network based in part on the group ID, and wherein the two or more circuits are further to use the key within the subset of the nodes to validate as the peer nodes within the network.

9. The two or more circuits of claim 8, wherein the two or more circuits of the subset of the nodes perform a client-server exchange using mutual Transport Layer Security (mTLS) and using the key to identify as the peer nodes.

10. The two or more circuits of claim 8, wherein the network is associated with Border Gateway Protocol (BGP) and a community ID of the BGP is derived from the secret for the subset of the nodes.

11. The two or more circuits of claim 8, wherein the group ID for the community is derived from the secret and wherein the secret is a user provided secret for at least one host processor of a host node and at least one node of the subset of the nodes in the network.

12. The two or more circuits of claim 8, wherein the two or more circuits are comprised in different processors and wherein the secret is generated autonomously by the different processors.

13. The two or more circuits of claim 8, wherein the two or more circuits generate and retain an address table of network addresses associated with the peer nodes based in part on a secure connection established, using the key, between the two or more circuits.

14. The two or more circuits of claim 8, wherein the two or more circuits are to communicate using at least one network device, the at least one network device comprising a routing table which is updated to represent that the subset of the nodes is part of the community and that the two or more circuits are potential ones of the peer nodes.

15. A method to discover peer nodes in a network, comprising:

communicating a group identifier (ID) generated by applying a first hash function to a secret from a host processor of a host node to further nodes in the network;

receiving, in the host processor, an indication of a subset of the nodes identifying as part of a community within the network, based in part on the group ID; and using a key generated by applying a second hash function to the secret, the second hash function being different from the first hash function, by the host node and at least one node of the subset of the nodes to form the peer nodes within the network.

16. The method of claim 15, further comprising:

performing, by the host node and the at least one node, a client-server exchange using mutual Transport Layer Security (mTLS) and using the key to identify as the peer nodes.

17. The method of claim 15, wherein the network is associated with Border Gateway Protocol (BGP) and a community ID of the BGP is derived from the secret for the subset of the nodes.

18. The method of claim 15, wherein the group ID for the community is derived from the secret, wherein the secret is a user provided secret for the host node and the at least one node of the subset of the nodes in the network or is generated autonomously by different processors, and wherein the different processors comprise the host processor and a further processor of the at least one node which together form all or part of the peer nodes.

19. The method of claim 15, wherein the host node and the at least one node in the peer nodes generate and retain an address table of network addresses associated with the peer nodes based in part on a secure connection established, using the key, between the host node and the at least one node.

20. The method of claim 15, further comprising:

communicating between the host node and the further nodes using at least one network device; and updating a routing table in the at least one network device to represent that the subset of the nodes is part of the community and that the host node and the at least one node are potential ones of the peer nodes.

* * * * *